(12) United States Patent
Villa

(10) Patent No.: US 6,692,197 B2
(45) Date of Patent: Feb. 17, 2004

(54) METAL CUTTING TOOL WITH DIRECT CUTTING PLATE ARRANGEMENT

(75) Inventor: Stefano Villa, Como (IT)

(73) Assignee: Walter Aktiengesellschaft AG, Tubingen (DE)

(*) Notice: Subject to any disclaimer, the term of this patent is extended or adjusted under 35 U.S.C. 154(b) by 0 days.

(21) Appl. No.: 09/945,503

(22) Filed: Aug. 30, 2001

(65) Prior Publication Data

US 2002/0028120 A1 Mar. 7, 2002

(30) Foreign Application Priority Data

Sep. 1, 2000 (DE) .......................... 100 43 015

(51) Int. Cl.[7] .............................. B23B 27/00; B23C 5/20
(52) U.S. Cl. ............................................ 407/35; 407/63
(58) Field of Search ............................ 407/34, 35, 36, 407/39, 42, 43, 46, 48, 51, 53, 54, 55, 56, 59, 61, 63

(56) References Cited

U.S. PATENT DOCUMENTS

| 4,790,693 | A | * | 12/1988 | Koblesky ..................... 407/35 |
| 4,954,021 | A | * | 9/1990 | Tsujimura et al. ............ 407/35 |
| 5,083,887 | A | * | 1/1992 | Dotany ......................... 407/59 |
| 5,603,365 | A | * | 2/1997 | Stewart ...................... 144/230 |
| 5,904,449 | A | * | 5/1999 | Satran et al. ................. 407/59 |
| 5,913,644 | A | * | 6/1999 | DeRoche et al. ............. 407/42 |

FOREIGN PATENT DOCUMENTS

| EP | 1 004 380 A1 | 5/2000 |
| WO | WO 98/07541 | 2/1998 |

* cited by examiner

Primary Examiner—Henry W. H. Tsai
(74) Attorney, Agent, or Firm—Leydig Voit & Mayer, Ltd.

(57) ABSTRACT

At least two cutting plates are provided for a metal cutting tool, particularly adopted for milling work, which are in direct contact with each other and therefore support each other. A particularly simple design of a plate seat may be used for a plurality of teeth with the cutting plates of a single chip groove in direct contact with each other for permitting a large metal cutting output.

15 Claims, 4 Drawing Sheets

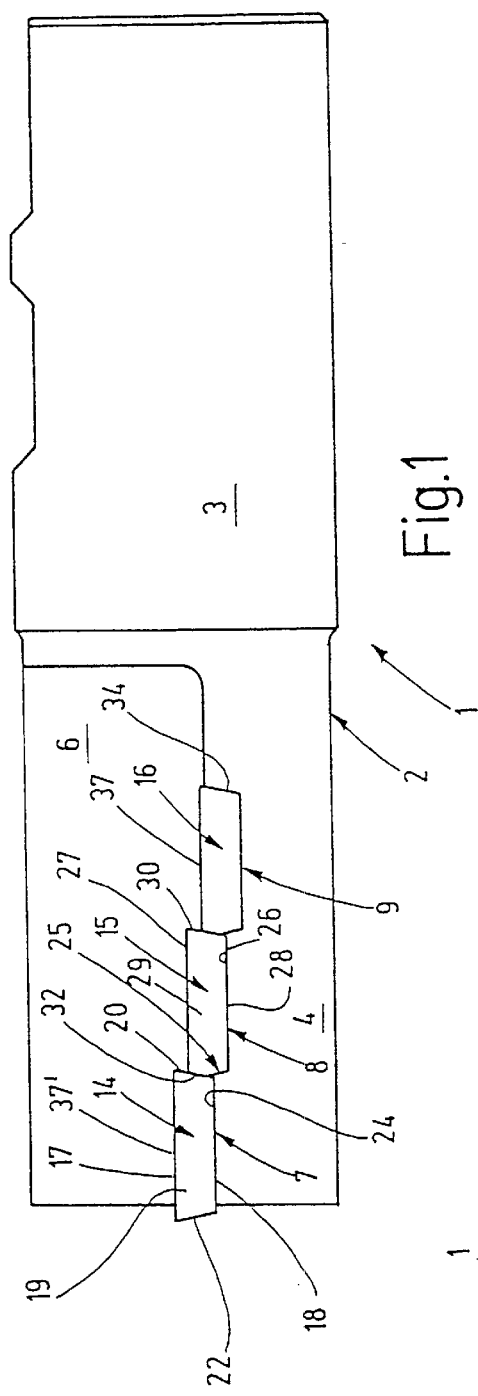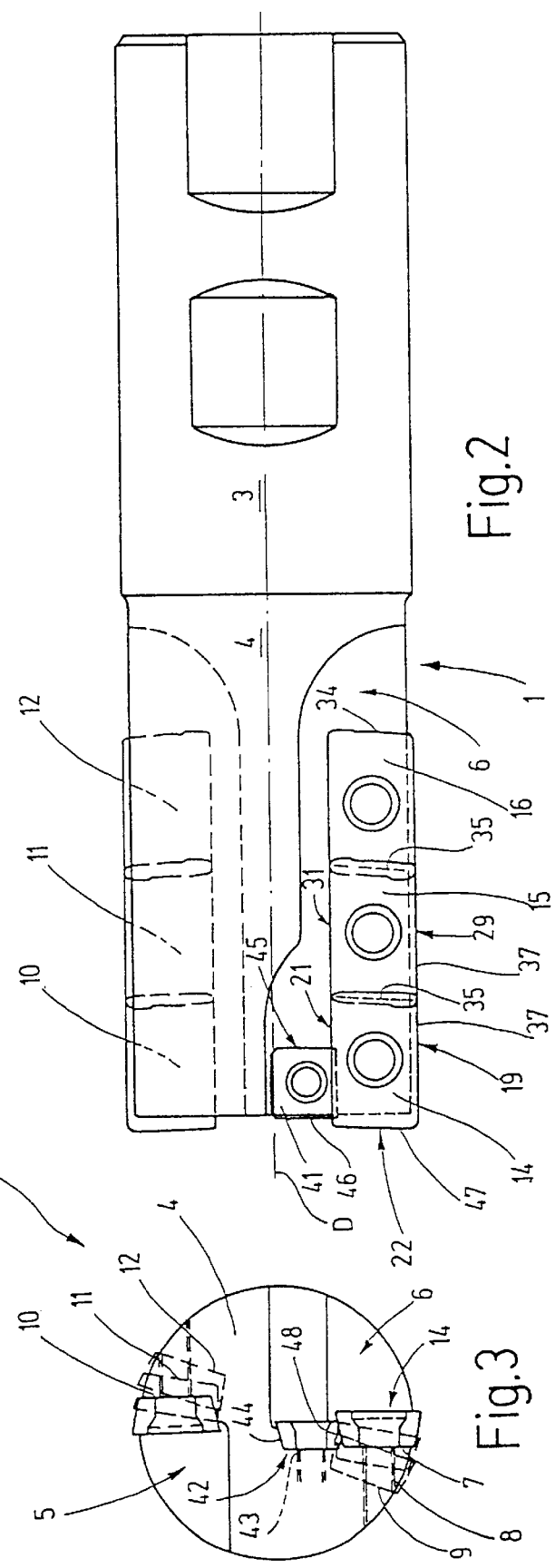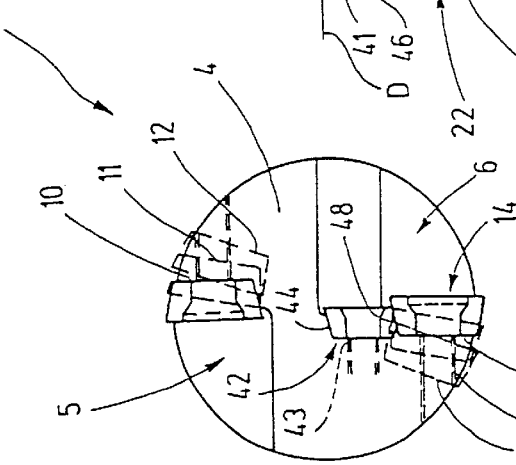

METAL CUTTING TOOL WITH DIRECT CUTTING PLATE ARRANGEMENT

FIELD OF THE INVENTION

The present invention relates generally to a metal cutting tool, and in particular, a metal cutting tool equipped for processing of workpieces by milling or drilling.

BACKGROUND OF THE INVENTION

Metal cutting tools for processing workpieces by cutting are in use, which have a tool body with several cutting plates releasably fastened thereon. As a rule, the cutting plates can be exchanged and have a great degree of hardness and wear resistance. The tool body in turn holds and guides the cutting plates in appropriate plate seats. Often the cutting edges which are used for processing by cutting are intended to be of a length which is greater than the length of a single cutting plate. In this case the desired cutting edge is put together from the cutting edges of several cutting plates which are arranged on the tool body in such a way that each slightly overlaps the other in the circumferential direction.

In connection with peripheral milling cutters in particular, the cutting plates are arranged one behind the other on a helical line in several chip grooves. In this case the cutting plates arranged in successive chip grooves are offset in the axial direction in such a way that they add up to form a complete cutting edge. However, two chip grooves are then required for forming one single complete peripheral cutting edge.

It has also been attempted to arrange the chip grove in such a way that the cutting plates overlap each other. In this way it is possible to form a complete cutting edge with the cutting plates of one chip groove. If, for example, such a metal cutting tool has three chip grooves, it has three complete peripheral cutting edges. It is possible to achieve a large metal cutting output in this way. However, the resultant spiral angle defined by the cutting plates arranged one behind the other in the chip grove becomes relatively shallow. The spiral angle is that angle which the row of cutting plates forms together with the tool axis. The helix angle is defined as the angle which the row of cutting plates forms together with the peripheral direction. The helix angle is large (almost 90°). In some cases this is not desired. Moreover, the axial support of the cutting edges is complicated.

The design of continuous cutting edges at the tool end of drilling tools whose radius is greater than the length of an available cutting plate is even more complicated. If, for example, it is intended to provide two overlapping cutting plates at the tool end, the plate seats required for this result is a considerable weakening of the tool body. Tools with more than one end cutting edge (for example with four cutting plates for creating two end cutting edges) are almost impossible to produce.

OBJECTS AND SUMMARY OF THE INVENTION

Based on the foregoing, it is an object of the invention to provide a metal cutting tool which, with a simple design, makes a large metal cutting output possible.

A metal cutting tool in accordance with the invention has a tool body with plate seats which are arranged and designed in such a way that lateral side faces of adjoining cutting plates contact each other so that their cutting edges join each other without a break, or they overlap each other. The mutual contacting of the cutting plates provides a support for the cutting plates, and at the same time, a simple design of the plate seats. A respective adjoining cutting plate then takes on the function of the lateral or axial support of a cutting edge. Therefore no further support surface need be provided in the plate seat at the location of the respective plate seats. Because of this, the plate seats may have a particularly simple design. The plate seats require little space and result in only slight weakening the tool body. It is therefore possible in a simple way to arrange a comparatively large number of cutting plates at the tool end.

Furthermore, a relatively steep helix angle results from the direct contacting of the cutting plates in the axial direction, which is fixed by the row of the cutting plates in each chip groove. This is beneficial for the stability of the tool body, which is therefore weakened very little by the respective chip grooves. This also can be beneficial for the metal cutting output, either because the tool body can withstand large forces, or in that a particularly large number of chip grooves is provided on the tool body, which then result in a large number of teeth (number of cutting edges, i.e. number of complete cutting edges).

Moreover, the arrangement in accordance with the invention assures that the overlap of adjoining cutting edges is comparatively small. This results in an even chip thickness along each cutting edge. Thus, each point on the cutting edge of each cutting plate can be optimally loaded, i.e. neither overloaded nor insufficiently loaded, so that the productivity of the cutting plates can be maximally used.

The plate seats can have resting surfaces arranged at the same height so that the cutting edges of adjoining cutting plate directly rest against each other. However, there is the possible danger that chips become wedged between the cutting plates. This is prevented if the cutting plates overlap each other at least slightly. This can be achieved by the use of cutting plates of varied thickness, or even better by an offset of the resting surfaces of the plate seats with respect to each other in a direction at right angles with the resting surfaces (i.e., circumferential direction). If possible, the offset of the resting surfaces should however be less than the thickness of the cutting plates so that adjoining cutting plates can make contact for supporting each other. In this respect it is particularly preferred to limit the distance between the resting surfaces of adjoining plate seats at the outer circumference of the cutting tool to such a size that the cutting plates have sufficient contact also at their radially outside border. This also applies to radially adjoining cutting plates, here, also, it is either possible to operate with cutting plates of different thickness, or with offset resting surfaces, in order to achieve that the end cutting edges of the tool overlap.

It is considered to be advantageous to divide the lateral faces used for supporting the cutting plates into areas, one of which is used as a contact area. In the extreme case the contact area can take up the entire lateral face, particularly if the cutting plates are of different thickness. However, preferably the contact area only occupies a portion of the lateral face, in which case the contact area then is preferably oriented parallel with the corresponding lateral face of the adjoining cutting plate. This can be achieved in that the angle between the contact area and the front of the one cutting plate coincides with the angle between the lateral face and the base of the other cutting plate.

The resulting contact level between the cutting plates is preferably oriented at an angle with respect to the resting surface of the plate seat, which is other than a right angle. It is possible by means of this inclination of the contact level to achieve a slight overlap of adjoining cutting edges which is just large enough that the cut of the cutting edge of one cutting plate makes a transition without a shoulder into the cut of the cutting edge of the adjoining cutting plate.

An planar contact as well as a line contact can exist between the cutting plates. The planar contact is considered to be advantageous in view of the transmission of cutting forces acting on the cutting plate.

Other objects and advantages of the invention will become apparent upon reading the following detailed description and upon reference to the drawings, in which:

BRIEF DESCRIPTION OF THE DRAWINGS

FIG. 1 is a side elevational view of a metal cutting tool in accordance with the invention, particularly adapted for a slot drilling cutter;

FIG. 2 is a top view of the metal cutting tool shown in FIG. 1;

FIG. 3 is an end view of the illustrated metal cutting tool;

Figure 4:
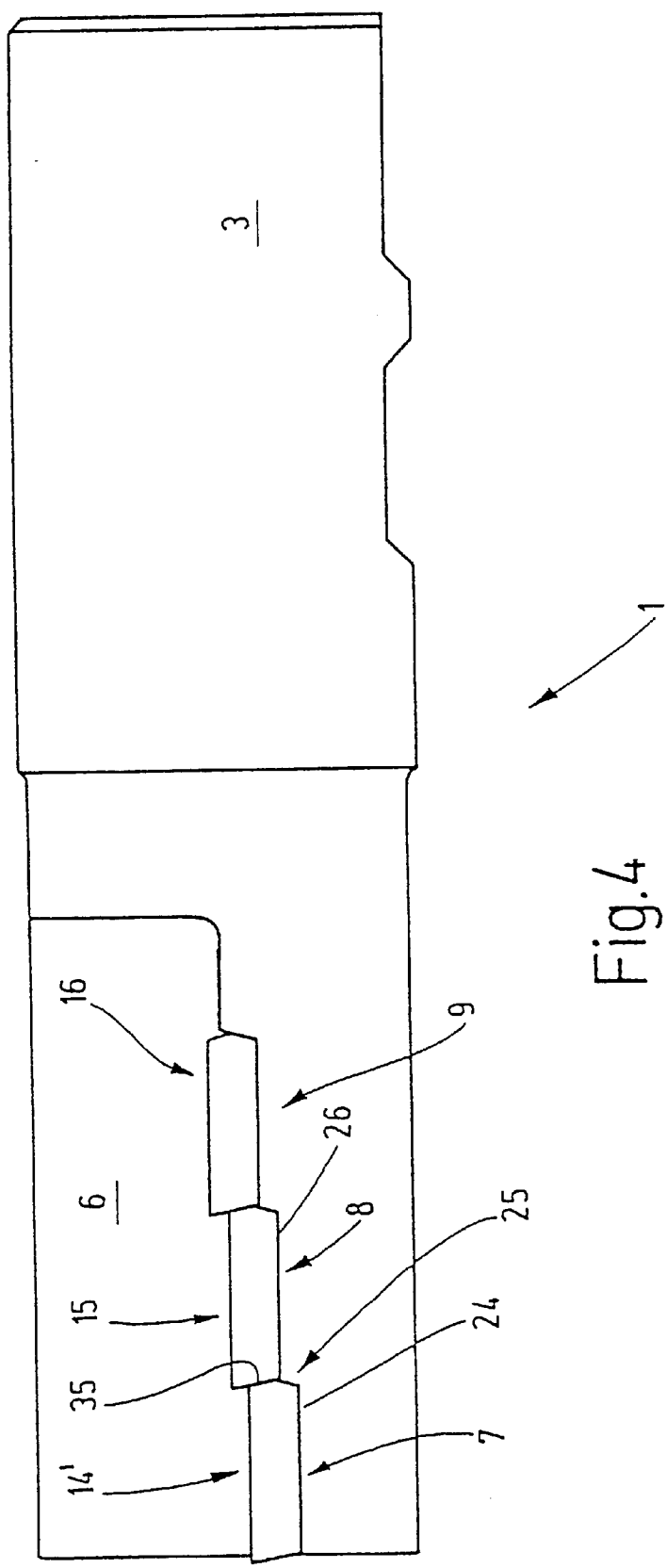
FIG. 4 is a side elevational view of a left-hand spiral embodiment of a metal cutting tool.

While the invention is susceptible of various modifications and alternative constructions, certain illustrated embodiments thereof have been shown in the drawings arid will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Referring now more particularly to the drawings, there is shown an illustrative metal cutting tool 1 embodying the present invention. The metal cutting tool 1 has a tool body 2 which includes a chucking element or section 3 at one end and a cutting plate support section 4 at the other end. The support section 4 has a generally cylindrical shape with a plurality of longitudinal extending chip grooves 5, 6. In the illustrated embodiment, two chip grooves 5, 6 are provided on diametrically opposed sides of the support section 4. Each chip groove 5, 6 is in the form a recess that extends in an axial direction and defines a plurality of plate seats 7, 8, 9 and 10, 11, 12, respectively.

The chip grooves 5, 6 and their plate seats 7, 8, 9, or 10, 11, 12 are identical and are preferably arranged symmetrically with respect to an axis of rotation D of the tool body 2. Accordingly, the following description of the plate seats 7, 8, 9 also applies to the plate seats 10, 11, 12.

The plate seats 7, 8, 9 are designed for holding cutting plates 14, 15, 16. The plates seats 14, 15, 16, which may be square-, rectangular- or parallelogram-shaped plates, each have an end face 17, a base 18 and several lateral side faces 19, 20, 21, 22, or 29, 30, 31, 32 (see FIGS. 1 and 2), which extend between the end face 17 and the base 18. The lateral side faces in this case include side faces 20, 22, and 30, 32 at longitudinal ends of the cutting plates and side faces 19, 21 and 29, 31 along longitudinal sides of the cutting plates. The base 18 is designed, for example, as a flat surface, while the end face 17 can be designed as a flat surface or another shape. For example, chip depressions, not further represented, or other shaped elements can be provided.

The plate seat 7 in this case defines a resting surface 24 in the form of a flat surface on which the cutting plate 18 rests. The resting surface 24 supports nearly all of the base 18 of the cutting plate 14 and in respect to the axial direction of the metal cutting tool 1 terminates directly at the lateral side face 20 of the cutting plate 14. At that point the resting surface 24 makes a transition by means of a step 25 to a further resting surface 26 for the adjoining cutting plate 15. The step 25, which radially rises from the resting surface 26, has a lesser depth than the thickness of the cutting plate 15 as measured between its end face 27 and its base 28. The lateral side face 31 farthest inward lies laterally against a corresponding contact surface of the plate seat 8. In the axial direction, the cutting plate 14 is supported on the cutting plate 15. The latter, in turn, rests against the cutting plate 16 which is similar to the cutting plate 15. The axial contact surface 34 of the plate seat 9 is used for supporting the cutting plate seat 16.

Figure 6:
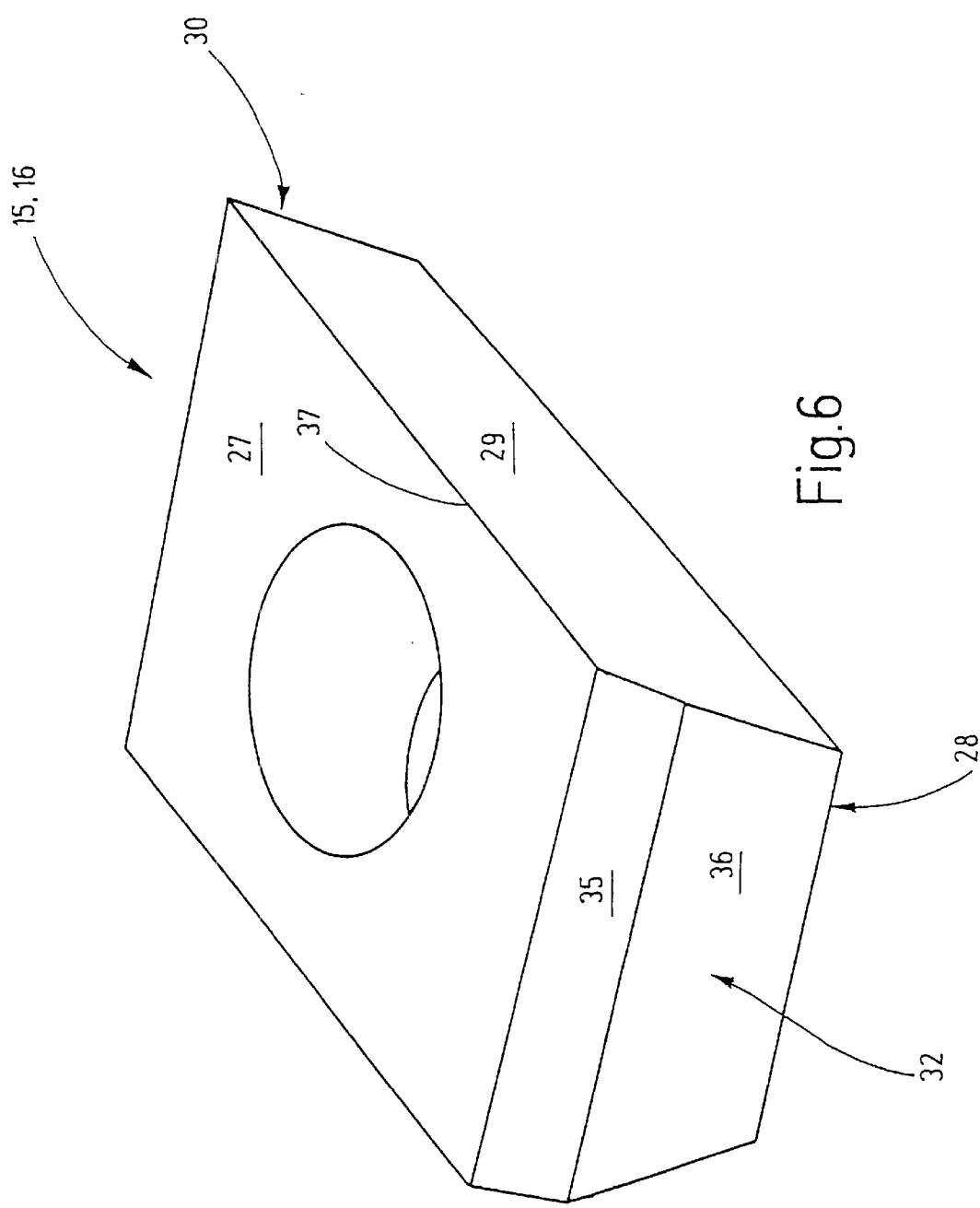
FIG. 6 is an enlarged perspective of an illustrative cutting plate for use with a metal cutting tool in accordance with the invention.

The cutting plates 15, 16 are represented in FIG. 6. As shown, the lateral side face 32 is divided into two areas 35, 36, wherein the area 35 constitutes a contact area and directly adjoins the end face 27. The remaining area 36 adjoins the base 28 of the cutting plates 15, 16. The areas 35, 36 define an obtuse angle between them. Moreover, the angle between the area 35 and the end face 27 essentially corresponds to the angle which the lateral face 20 forms with the base 18 of the adjoining cutting plate 14 (see FIG. 1).

The cutting plate 15, 16 has a cutting edge 37, which starts at the corner between the end face 27, the area 35 and the lateral side face 29. The cutting edge 37 extends approximately straight as far as the corner between the end face 27 and the lateral faces 29, 30. A corresponding cutting edge 37' is formed on the adjoining cutting plate 14. As represented in FIG. 2, the cutting edges 37', 37 slightly overlap in their corner areas so that they adjoin each other without gaps.

With the metal cutting tool in accordance with FIG. 2, an end cutting plate 41 is provided in the chip groove 6 in addition to the cutting plates 14, 15, 16, which is designed as a square plate. The cutting plate 41 has a fastening bore, similar to the other cutting plates 14, 15, 16, and is held on its plate seat by means of an appropriate fastening screw. Its plate seat 42, which can be seen in greater detail in FIG. 3, has a radially oriented flat resting surface 43, which is adjoined by a lateral contact face 44 on the side of the axis of rotation of the cutting tool. Furthermore, an axial lateral contact face 45, shown in FIG. 2, can be provided. The resting surface 43 and the lateral contact faces 44, 45 position the cutting plate 41 in such a way, that its end cutting edge 46 extends up to the axis of rotation D or beyond it.

The resting surface 43 is slightly offset in respect to the resting surface 24. However, it can also be arranged at the same height as that surface. Nevertheless, its end cutting edge 46 slightly overlaps a cutting edge 47 at the end of the cutting plate 14. This is the result of the different thicknesses of the cutting plates 42, 14 and of the inclination of the lateral faces 21 with respect to the base 18 of the cutting plate 14. The cutting plate 42 is slightly thinner than the cutting plate 14 and therefore extends behind the latter.

In at least the area of its front end, the cutting plate 14 is in radial contact on the side of the axis of rotation with the cutting plate 41. To this end, the latter has a contact area 48, whose inclination is matched to the lateral side face 21 of the cutting plate 14 and which constitutes a support surface for the cutting plate 14. The latter is therefore respectively supported in the axial direction as well as in the radial direction by a further cutting plate.

The metal cutting tool 1 so far described is a slot-drilling cutter, which forms a complete cutting edge at the end by means of the cutting edges 46, 47 and has two complete peripheral cutting edges. During operation, this slot-drilling cutter can be moved axially, as well as radial advancement. Because of the two peripheral cutting edges, the metal cutting output is large, in particular during milling operations (radial advancement movement). Since the offset between two cutting plates 14, 15, or 15, 16, which follow each other in the axial direction, is respectively less than a plate thickness, a relatively shallow spiral angle is formed so that the tool body 2, in particular its cutting plate support section 4, is only weakened slightly. The chip grooves 5, 6 are almost straight.

It can be seen that three different cutting plate types can be used in connection with the above described metal cutting tool 1, namely the cutting plates 15, 16, as illustrated in FIG. 6, and wherein one of the respectively oppositely located lateral faces 30, 32 is provided with an inclined area (contact face 35). A further type is the cutting plate 14, wherein the lateral faces 20, 22 located opposite each other are identically embodied. The third structure is the cutting plate 41, arranged at the axis of rotation D.

However, it is also possible to equip the chip groove 5 or 6 with three identical cutting plates 14', 15, 16 if, as illustrated in FIG. 4, the plate seats 7, 8, 9 are arranged in such a way that a left-hand spiral metal cutting tool 1 results. The difference lies in the embodiment of the step 25. With the embodiment of the metal cutting tool 1 in accordance with FIG. 1, the step 25 is oriented such that the resting surface 26 of the plate seat which is farthest removed from the end trails the resting surface 24 of the plate seat 7, which is closer to the end, in respect to the rotation of the metal cutting tool 1. The conditions are reversed with the embodiment of the metal cutting tool 1 in accordance with FIG. 4. The step 25 is oriented such that the resting surface 26 of the plate seat 8, which is more remote from the end, leads the resting surface 24 of the plate seat 7, which is closer to the end, in respect to the rotation of the metal cutting tool 1.

Figure 5:
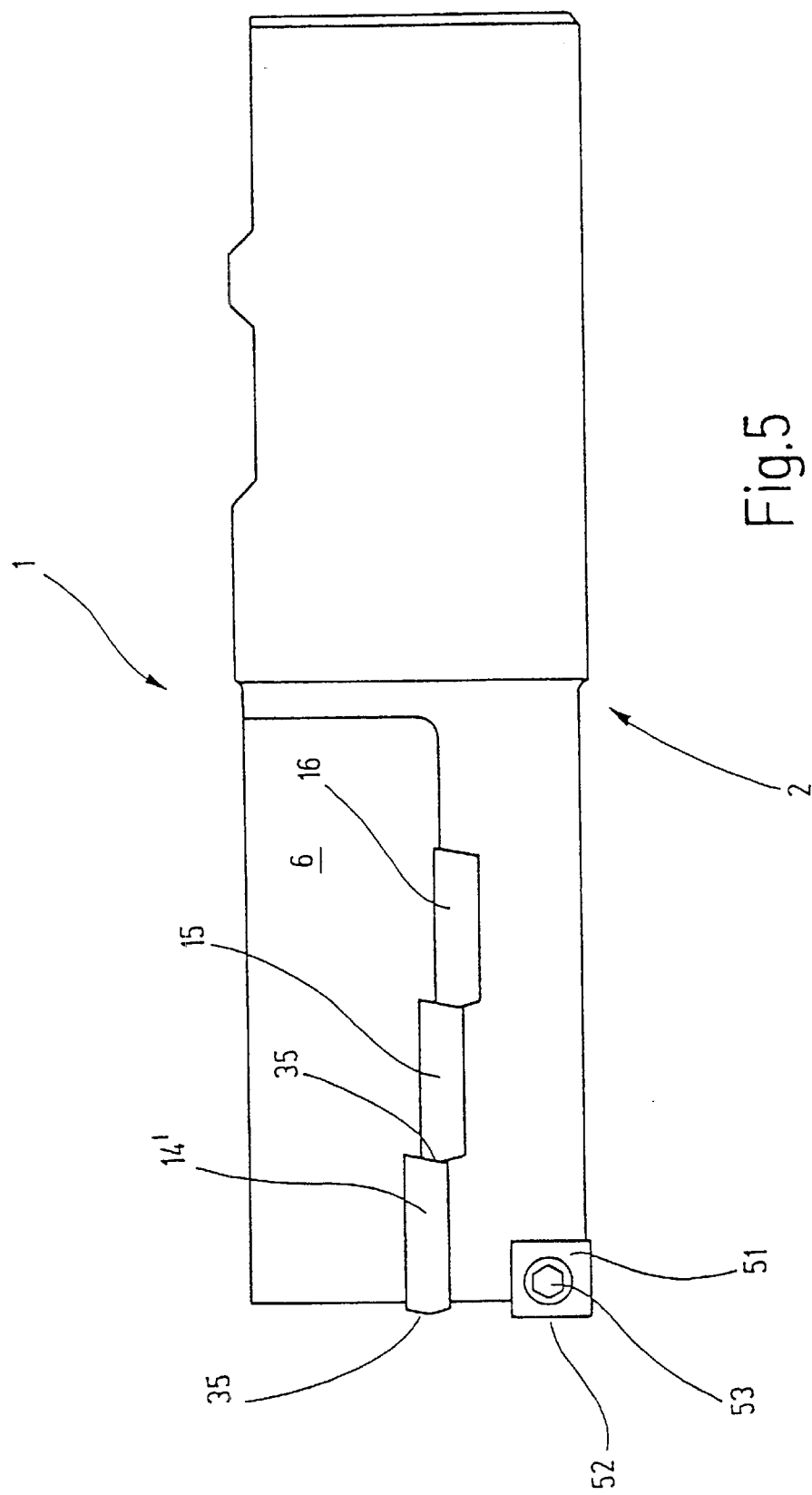
FIG. 5 is a right-hand spiral embodiment of a metal cutting tool having uniform cutting plates in a chip groove and including an additional end cutting plate.

Moreover, with a right-hand spiral metal cutting tool 1 it is also possible to operate with identical cutting plates 14', 15, 16 in a chip groove 6, if the cutting plate 14' at the end does not have an end cutting edge, as represented in FIG. 5. The area 35, otherwise used as a contact face, of the cutting plate 14' then has no function. If an end cutting edge is needed, it can be provided on a separate cutting plate 51. This cutting plate 51, for example designed as a square plate, is provided at a separate plate seat and projects axially farther forward than the cutting plate 14'. Therefore its end cutting edge 52 is active. The cutting plate 51 is installed as a radial plate, i.e. its plate seat is embodied such that its fastening screw 53 extends approximately in the circumferential direction. If required, the cutting plate 51 can also be installed as a lateral plate, which has advantages in regard to the design of the tool body 2. The latter is then less weakened in the area of the respective plate seat. In this case the fastening screw 53 extends in the axial direction.

In connection with a metal cutting tool 1 being used as a milling tool, at least two cutting plates 14, 15 are provided, which are in direct contact with each other and therefore support each other. A particularly simple design of the plate seat and the use of a number of teeth become possible with the cutting plates in a single chip groove because of the direct contact between the cutting plates 14, 15. This permits a large metal cutting output.

What is claimed is:

1. A metal cutting tool (1) adapted for milling work comprising
a rotatable tool body (2) formed with at least two adjoining plate seats (7, 8) for receiving and supporting a plurality of cutting plates (14, 15), each said cutting plate having a base (18, 28), an end face (17, 27) that defines a cutting edge (37', 37) and lateral side faces (20, 32) extending between the base (18, 28) and the end face (17, 27), said plate seats (7, 8) being arranged such that the cutting plates (14, 15) are in a longitudinal row with the cutting edges (37', 37) of the cuffing plates (14, 15) being in circumferentially staggered non-contacting relation to each other and said cutting plates (14, 15) each being in contacting engagement with other at least over part (35) of said lateral side faces (20, 32) such that one cutting plate longitudinally supports an adjacent cutting plate in the longitudinal row against longitudinal forces when the cutting plates (14, 15) are fastened in the plate seats (7, 8) and the cutting tool is operated.

2. The metal cutting tool of claim 1 in which adjoining plate seats (7, 8) have resting surfaces (24, 26) which are arranged a distance from each other in a direction oriented at right angles to the resting surface (24, 26) such that one of the resting surfaces (26) is lower than the other resting surface (24).

3. The metal cutting tool of claim 2 in which said distance is less than a thickness measured between the base (28) and end face (27) of the cutting plate (15) seated on the lower resting surface (26).

4. The metal cutting tool of claim 1 in which at least one of the lateral side faces (32) of at least one of the cutting plates (15) is divided into two discrete areas (35, 36), one area (35) of which is used as a contact area for engaging another cuffing plate (14) laterally adjacent thereto.

5. The metal cutting tool of claim 4, in which said one area (35) used as a contact area forms an obtuse angle with the end face (27) of the cutting plate (15).

6. The metal cutting tool of claim 5, in which the lateral side face (20) of an adjacent cutting plate (14) contacted by the one area (35) forms an obtuse angle with the base (18) of said adjacent cuffing plate (14) essentially corresponding to said obtuse angle said one area forms with the end face (27) of the cutting plate (15).

7. The metal cutting tool of claim 1 in which said cutting plates (14, 15) are arranged so that peripheral cutting edges (37', 37) of the cutting plates (14, 15) overlap in a longitudinal direction for together defining a gap-free peripheral cutting edge.

8. The metal cutting tool of claim 1 in which said cutting edges (37', 37) of said cutting plates (14, 15) are disposed in substantial parallel relation to each other.

9. The metal cutting tool of claim 1 in which said cutting edges (37', 37) of said cutting plated (14, 15) are disposed in substantial parallel relation to an axis of rotation of said tool body (2).

10. A metal cutting tool (1) comprising:
a tool body (2) rotatable about a central axis,
at least two end cutting plates supported at an axial end of said tool body (2), and
said cutting plates (41, 14) each having an end cutting edge (46, 47) and being arranged in said tool body (2)

in a radial row, said at least two cutting plates being in contacting engagement with each other such that one plate supports an adjacent plate in the radial row against radial forces incurred during operation of the cutting tool.

11. The metal cutting tool of claim 10 which said end cutting edges (46, 47) define a gap-free end cutting edge.

12. The metal cutting tool of claim 10 which said end cutting edges define a gap-free cutting edge extending from the axis of said tool body.

13. The metal cutting tool of claim 10 including at least two longitudinal cutting blades (14, 15) supported in said tool body with lateral ends in at least partially abutting engagement with each other, said longitudinal cutting plates (14, 15) each having an end face (17, 27) defining a longitudinal cutting edges (37', 37) disposed at an angle to the end cutting edges (46, 47) of said end cutting plates (41, 14).

14. The metal cutting tool of claim 13 in which said longitudinal cutting edges (37', 37) of said longitudinal cutting plates (14, 15) are circumferentially offset relative to each other for defining a staggered cutting edge.

15. A metal cutting tool (1) comprising:

a tool body (2) rotatable about a central axis, a plurality of cutting plates, at least two of said cutting plates being supported at an axial end of said tool body (2), said at least two said cutting plates (41, 14) supported in the axial end of said tool body each having an end cutting edge (46, 47) and being arranged in said tool body (2) in at least partial supporting contact with each other in a radial direction to define a radial row of cutting plates, at least two of said cutting plates being supported in said tool body with lateral ends in at least partially abutting engagement with each other to define a longitudinal row of said cutting plates, said cutting plates (14, 15) in said longitudinal row each having an end face (17, 27) defining a longitudinal edge (37', 37) disposed at an angle to the cutting edges (46, 47) of the cutting plates (41, 14) supported in the axially end of said tool body (2); and one of said cutting plates (14) being in both said radial row and longitudinal row of cutting plates.

\* \* \* \* \*